US006106917A

United States Patent [19]

Pereira et al.

[11] Patent Number: 6,106,917

[45] Date of Patent: Aug. 22, 2000

[54] CONTAINER WITH LABEL FOR HAIR DYE

[75] Inventors: Joseph J. Pereira, West Redding; Kimberly A. Slavin, Norwalk; Nicola Delli Venneri, Darien, all of Conn.

[73] Assignee: Bristol-Myers Squibb Company, New York, N.Y.

[21] Appl. No.: 08/915,162

[22] Filed: Aug. 20, 1997

[51] Int. Cl.[7] ............................ B32B 29/00; B65D 85/00

[52] U.S. Cl. ..................... 428/42.3; 206/459.5; 206/581; 206/823; 428/41.6; 428/42.1

[58] Field of Search ................................ 428/34.1, 40.1, 428/41.6, 42.1, 42.3; 206/389, 390, 391, 459.5, 581, 823, 828

[56] References Cited

U.S. PATENT DOCUMENTS 2,789,689 4/1957 Lewis .................................. 206/45.31

4,763,930 8/1988 Matney .................................... 283/81

5,326,575 7/1994 Spaulding ................................ 426/87

*Primary Examiner*—Nasser Ahmad

*Assistant Examiner*—Derek Jessen

*Attorney, Agent, or Firm*—Charles J. Zeller; Morton S. Simon

[57] ABSTRACT

A hair dye product is packaged in a container having a web-printed label. The label is printed on high quality paper or plastic film and has a picture of a human model whose hair is the color sought to be obtained by the hair dye. The printing process provides an accurate reproduction of the tone and hue of each hair color over the entire production run of the labels. The container may be a relatively low cost generic container of web-printed paperboard or plastic produced in a high volume production run.

26 Claims, 2 Drawing Sheets

(1 of 2 Drawing Sheet(s) Filed in Color)

SHADE # 02

SHADE # 02

SHADE # 06

SHADE # 10

CONTAINER WITH LABEL FOR HAIR DYE

FIELD OF THE INVENTION

The present invention relates to the field of packaging, especially packaging for cosmetic products, and more particularly to containers for hair dye products, and to the methods of manufacturing such packaging.

BACKGROUND OF THE INVENTION

Consumer products are quite often provided to customers packaged in a paperboard (cardboard) carton or a container made of some other flexible or rigid material. The package often has a picture illustrating the product, the use of the product, or some other image intended to promote the sale of the product. In particular, many cosmetic products, such as hair dye kits (hair color kits) and hair shampoo, are packaged in paperboard (cardboard) cartons and other containers. The cartons are often printed with a color picture depicting a model. For example, the model has the color of hair which the hair dye is designed to produce. Such cartons are printed using a sheet-fed printing process, which may be expensive and may pose inventory problems.

It is commercially important that the picture be both pleasing and accurate. Some of the most common problems in achieving a pleasing and accurate picture are the following:

The skin tones of the model are not natural, but instead are off-color, as compared to the lifelike image utilized as a reference ("matchprint") i.e., too red or uneven.

The hair color is not an accurate representation of the color which is sought to be produced by the hair dye kit.

There is a lack of consistency in the pictures, so that a picture on a carton from one printing run, when displayed on a store shelf next to another carton from the same or a different printing run, will not match in appearance.

Poor image quality quite understandably reflects negatively on the consumer's purchasing decision, especially in the hair color field where the consumer should see an accurate rendition of the color sought to be obtained by treatment of the hair.

In order to obtain an acceptable printed image on hair color kit cartons, it has been necessary to print using a sheet-fed printing process and to utilize the highest quality bleached white paperboard called "SBS" (Solid Bleached Sulphate) paperboard. SBS paperboard, however, is generally expensive compared to lower grades of paperboard, such as paperboard using reprocessed paper, for example, "clay coated news". In addition, in some countries SBS paperboard is not available and a lower quality paperboard must be used, resulting in a lower quality image.

The SBS paperboard used in the prior art manufacture of cosmetic cartons, especially hair color kit cartons that require high quality images,is provided to the printer in the form of sheets (e.g., 3 feet by 6 feet) and 20 pounds. A large quantity (500 to 2000 sheets) of such SBS paperboard sheets are loaded in a magazine upstream of the printer and are fed individually into the printer, which comprises various rollers for conveying the sheet and printing cylinders for depositing the process inks and the line inks. The high quality of the printed image required for these cosmetic products cartons limits significantly the printing speed for the SBS sheets (typically from about 30 to about 50 sheets per minute).

The SBS paperboard must be sheet-fed into the printer in a certain orientation, due to grain direction of the paperboard, and after being printed is die-cut to form the carton blank. This may limit the designer's ability to maximize the use of the sheet for the carton and thereby minimize the waste areas between cartons.

The printed carton blanks are shipped flat to various plants, worldwide, and held in inventory. When needed, the flat carton blanks are folded into cartons, and the product is placed inside. There may be over 40 shades of hair dye in one product line. A manufacturer may have over 10 product lines and thus may have to manufacture and inventory over 400 different carton types, i.e., over 400 different pictures and texts. Consequently, over 400 different carton types must be kept in inventory and shipped to numerous plants, many of which may be in foreign countries. It is quite costly to manufacture, ship and maintain a complete inventory of hundreds of different carton types in a worldwide distribution network. In addition, the cartons may, over time, absorb moisture and become unusable.

It is very expensive to print "short runs", i.e., of 10,000 to 100,000 cartons. But since there are so many carton types, many short runs are required to be printed. Consequently, the cost of SBS paperboard cartons for use in hair color kit products may be a significant portion of the manufacturing cost of the hair dye kit.

Printed labels are often used on packaging on which it may be difficult or costly to print directly on the package. For example, beer, wine and other glass bottles use printed labels, which are adhered to the bottles, as it is difficult to print in color on glass. Printed adhesive labels are also used on paperboard cartons, plastic bottles and other containers. However, in these cases the quality of the printed image is not critical, i.e., there is no attempt to obtain an accurate reproduction of a hair tone which is uniform from one printing batch to the next or within batches.

Labels are currently, and generally, of various types. One label type is a sheet of paper which is printed on one face. An adhesive may be applied to the unprinted face of the label in a label-applying machine just before the label is pressed against a container. Another label type is made from a continuous one-layer web that is printed to form a plurality of images (labels). The labels are cut from the web in a separate operation and applied to the container by adhesive. Another type of label system, called "pressure sensitive labels", consists of a bottom supporting web (release liner), generally of a low grade of paper stock, plastic film or hybrid material, and the label itself, which may be of a high grade of paper stock. The label is part of a top layer of the two-layer web. The label is printed on one face (front face) and has a pressure sensitive adhesive (permanent or removable) on its opposite face (back face). The pressure sensitive adhesive retains the label on the supporting web. A release coating on the supporting web permits the label to be removed. The label is removed from the supporting web, generally by machine and then pressed on the product or container, generally by the same machine.

As used herein, the term "pressure sensitive label" refers to a label removably held to a supporting web by a pressure sensitive adhesive, and which is capable of being printed, removed from the supporting web, and pressed onto a container. The printing of such pressure sensitive labels may be performed by various printing methods. The preferred method is rotogravure printing of labels on a continuous web using the conventional four-color process, with possibly additional color inks. The four-color printing process uses four printing cylinders which are inked, respectively, with process (transparent) yellow, process magenta, process cyan and process black ink. Line colors can be added using other colors of printing inks, for example, gold and line black inks.

Rotogravure is a roll (web-fed) process in which the cells are etched on the surface of the printing cylinder to form the image area. The cylinder surface is flooded with ink. The image area retaining the ink within the cells is scraped clean of excess ink, i.e., using a doctor blade, and then directly pressed on the paper, transferring the ink to the paper. The etching is in the form of tiny cells, typically 22,500 cells/$in^2$ (for example, 250 cells per line of inch); however, more cells per inch may be used and the cells may vary in depth to provide a variation in ink capacity. The preferred web-fed printing process is rotogravure; however, photogravure and off-set printing, as well as other types of cylinder (roll) printing, are within the terms "web-fed printing" and "cylinder printing".

The use of a continuous web, instead of a flat sheet, is a relatively economical method in which the product is a roll of pressure sensitive labels on a supporting web. The web-fed printing process is at a high speed, at least 10,000 linear feet per hour. The roll of labels is adapted to be used in an automatic label-applying machine which applies the labels to a die-cut carton or other container. The four-color printing process uses four printing cylinders which are inked, respectively, with process (transparent) yellow, magenta, cyan and black ink. Line colors can be added using other colors of printing inks. In the process of the present invention it is critical that the print from each cylinder, or plate, be exactly aligned (registered) on the label to obtain an accurate and life-like image. Any misregistration may result in an image whose color is inaccurate or which is fuzzy in detail.

The web is processed through a printer by rollers which pull the web from a supply roll. Any variation in the printing conditions, including variations in temperature, humidity, pull-roll speed and/or tension, may cause slight movement of the web away from its intended path of travel. Such movements may cause minute differences in the registration of the labels as they are being printed. Those minute misregistrations degrade the image. Such slight movements of the web, minutely distorting the images, can be cumulative through the course of processing an entire web, leading to visible degradations in the printed labels. For example, if a run of 10,000 labels is to be printed and the minute misregistrations are cumulative, the image on the first label at the beginning of the run will not match the images on the labels from the middle or end of the run. If the labels are applied to cartons, and the non-matching labels end up on a store shelf side-by-side, the differences in hair tone and/or color may be noticeable to a consumer. That consumer may be confused as to the actual hair color which she seeks or may feel that the product is inferior because its packaging is non-uniform. Because hair dye kits, in some cases, are impulse items, a potential customer who feels even subliminally uneasy because of a sub-standard image on the packaging may purchase a competitive product.

SUMMARY OF THE INVENTION

In accordance with the present invention there is provided a method and product for the display of images on containers of hair dye kits in which the images, especially the pictures of hair, are accurate in shade and color. The images are essentially without printing variations due to minute misregistrations in the printing process.

The images are printed on labels, called herein "web-printed labels", which are printed using a web-fed printing process, e.g., a cylinder (roll) printing process, and the labels are formed into a roll. For example, the web (roll) may be a single layer of paper or plastic which is printed, on its front (top) face, and then cut into individual labels. Preferably, however, the web-printed labels are pressure sensitive labels carried on a paper or plastic supporting web. The term "roll" refers to both single-layer and multi-layer types of web-printed labels. Preferably the labels are high quality glossy paper, preferably white high gloss or semi-gloss paper in the range of 50–80 pounds and most preferably white gold high gloss paper. Alternatively, the images may be printed on transparent or translucent plastic film which is cut to form pressure sensitive labels. The use of high-quality paper or plastic film permits the images to be more life-like than is obtainable were they printed on paperboard, even when the paperboard is a high-quality paperboard. The labels may be embossed. Small copies of the labels, postage stamp size, may be used on store shelves for identification of the products.

The term "container", as used herein, refers to any shape or form of package to contain therein a hair color product and includes both primary and secondary packaging. By "hair color product" is meant the composition containing the hair dye ingredients intended for application to the hair of the consumer in accordance with product instructions. A primary package is a container which is in direct contact with the hair color product, for example, a glass or plastic bottle which contains a hair dye composition. A secondary package contains one or more primary packages therein, for example, a paperboard or plastic carton which contains one or more primary packages therein. In oxidative hair dyeing the secondary package typically contains a first container of hair dye lotion and a second container of a peroxide color developer, the contents for these containers being mixed at time of use. The secondary packaging for such products are often referred to as kits.

The use of separately printed web-printed labels, for example, web-printed pressure sensitive labels, permits an image of a model, with the color accuracy required for hair color products, to be used on a wide variety of primary and secondary packaging, including packaging upon which it is not possible or economically feasible to directly print an accurate color image.

The margin of the web has printed on it a set of color squares at selected locations, one for each color of ink, which identifies the position (registration) of the color printing cylinders. The color square's position is read by an operator and a reader (video-magnifier) and its data is entered into the printer's controlling computer. The required tension is printed on the web using a bar code and the tension is adjusted based on a system of load cells connected to the controlling computer. The operator adjusts the take-up rollers at each cylinder, or cylinders themselves, so that the exact required web position is attained. Generally such adjustment is performed by movements of rollers or cylinders in the direction of their axes within the millimeter range. Web position is critical for the printer's ability to accurately register each of the printing cylinders with the image area. Accurate color printing provides a more life-like image which is exactly the same for all the labels of a print run and exactly the same from one print run to another.

The labels, after printing, are shipped to the various plants for later application, by machine, to containers. For example, the containers may be cartons of SBS, or paperboard of lower quality and less cost than the SBS paperboard. For example, the cartons may be of SBS (Solid Bleached Sulphate) with a caliper in the range of 14–22 points. The cartons, may be of reprocessed paper. For example, the carton paperboard may be clay coated news back recycled paperboard (CCN), or other recycled paperboard, in the caliper range of 14–22 points. The cartons may be purchased locally, which saves the cost of shipping.

Preferably the printing of the carton paperboard is by a web-printing process, which has cost advantages compared to sheet-fed printing. The carton paperboard may be printed with text, such as instructions, product ingredients, line colors, background colors, etc., and lower quality images, having a density range below 2.0. The paperboard stock may be a roll that is fed as a web to the web printer, i.e., off-set or rotogravure. Such web-fed printing is at high speed, over 10,000 linear feet per hour. This may be faster, and consequently more economical, than a sheet-fed printing process.

Since the products may be distinguished by the labels, and not by printing on the cartons, it is only necessary to have an inventory of different labels. The cartons, for each product line, are the same, regardless of the label which is applied. It is less costly to maintain an inventory of, for example, 40 different label types, than an inventory of 40 different carton types. Most importantly in terms of cost, the cartons are "generic" (used for many hair dye colors) and consequently the generic cartons are preferably printed in "long runs" (at least 300,000 and preferably over 1,000, 000). Such long runs are printed by a web-fed printing process from web-fed rolls of paperboard stock and result in a carton price which is one-third, or less, than the cost of cartons with the hair color image printed using short runs.

The use of pressure sensitive labels permits a number of enhancements which are not possible with simply printing on a carton. In one embodiment a layer of high-gloss aluminum foil is interposed between the label layer and the adhesive layer. The model's face area, on an image, is die-cut and may be lifted off, e.g., it is separately peelably removable. The customer may then use the aluminum foil, underneath the removed face area, as a mirror. She may see her own face framed by the printed hair in order to envision how she would look with the color of hair illustrated on the label.

As another example, labels may be printed which are miniatures (reduced in size) and which duplicate the regular size labels which are adhered to the product boxes. These miniature labels may be used on the front of shelves to identify the products displayed on the shelves. The container may be a transparent plastic box and the label may be printed on both its front and back sides. A picture, or text, on the back of the label may be viewed by looking through the plastic container.

"The file of this patent contains at least one drawing executed in color. Copies of this patent with color drawing (s) will be provided by the Patent and Trademark Office upon request and payment of the necessary fee."

BRIEF DESCRIPTION OF THE DRAWING

In the enclosed drawing.

DETAILED DESCRIPTION OF THE INVENTION

Figure 1:
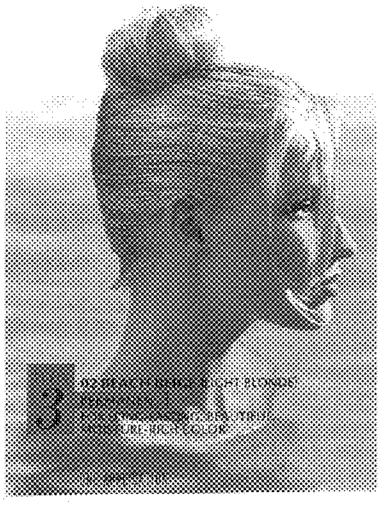
FIGS. 1–3 are images for a hair dye product which show models having three different hair colors. The colors are related (members of the same color family) and consist of shade No. 02 (FIG. 1), No. 06 (FIG. 2), and No. 010 (FIG. 3)

It is difficult to obtain good consistent color quality of printed images because of problems of color control, mainly related to process limitations, process variability and communication, i.e., between the printing company and the advertising agency. The color inks used in the four-color printing process, called "process inks", are the pigmented subtractive primary ink colors of cyan (process blue), magenta (process red) and yellow, along with black. Each color process ink is a transparent printing ink designed to absorb about one-third and transmit two-thirds of the visible spectrum. The paper reflects the light and the inks absorb portions of it. Generally a halftone screen breaks up colored pictures into tiny dots. A 150-line screen has 150×150 dots (22,500) in a square inch. For example, red is obtained by printing both magenta dots (absorbs green) and yellow dots (absorbs blue) leaving only red reflected from the paper.

Since the color is obtained by reflection from the paper, its surface smoothness and other characteristics are important in the quality of the printed image.

Often hair dye packaging uses a picture of a human model. However, human flesh is a "memory color" (psychological reference color) which is a color seen regularly that people tend to remember best. It is difficult to obtain a print reproduction which is close as possible to flesh color.

In general, the better the quality of paper, in terms of brightness and smoothness, the greater is the density range that is obtainable. "Density" is the ability of a material to absorb light and is inversely proportional to the amount of light reflected from a surface. An original transparency may have a density range (from highlight to shadow) of 2.70 (a measurement made by a densitometer). A four-color reproduction on high quality glossy paper and good ink may have a density range of 2.00. However, on uncoated paper, such as some types of paperboard, the maximum density range may be only 1.70 or less. A lower density range results in tone compression so that the picture appears flattened. As the paper grade becomes less, the color saturation will also decrease.

The use of a paper label or plastic film label carried on a paper web and printed in color while on the web permits more flexibility in the selection of paper grade or plastic film than printing on paperboard.

The paper quality (paper grade) has an effect on the number of lines of the screen per inch (the number of dots per inch) which may be used; the size of the dots in the highlight, middletones and shadow; the tone scale; the contrast; gray balance and the saturation. A smooth hard surface paper will produce whiter highlights (reflect more light to the observer's eyes). The shadow areas will be glossy, as the ink will tend to remain on the surface, which will increase the density of shadows and increase the color saturation. Lower quality papers with a rougher texture and more absorbent surface will generally produce lower quality color reproductions.

In printing labels on a supporting web, the material of the web is under tension. "Stretch", which is the distortion of the paper size, may occur in the cross-grain direction (direction of fibers corresponding to the direction the supporting web paper was made). The cross-grain direction expands and contracts as the web paper responds to moisture, temperature and pressure. Stretching may cause register problems.

In addition, changes in moisture content may result in "fiber puff", which is a swelling of certain fibers in the paper. This causes changes in the paper surface and degrades the image. The use of cardboard as the printing surface may permit more instances of fiber puff than printing labels from high-grade paper or plastic film.

These problems are mainly solved, in the present invention, by using high-grade glossy paper or plastic film for the labels and controlling web tension, at each printing cylinder, under operator control.

Figure 5:
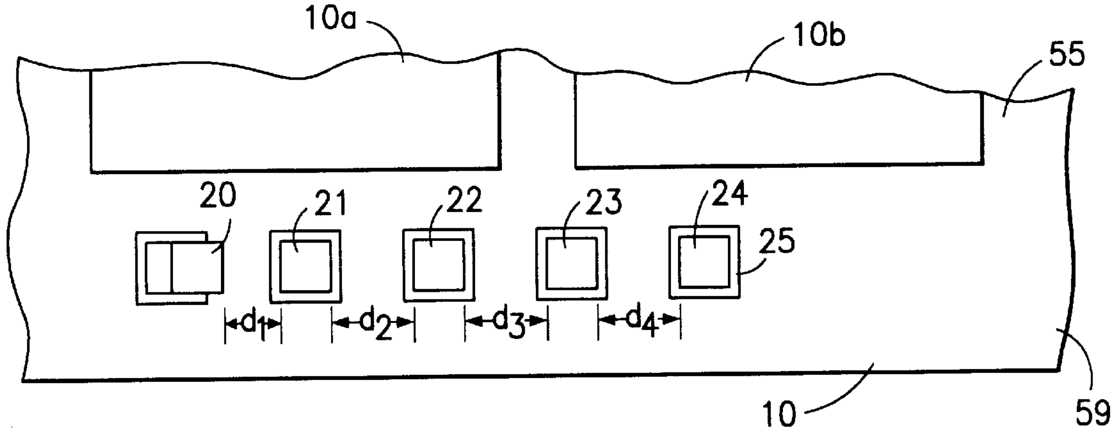
FIG. 5 is an enlarged top plan view of color squares on the web which are used for registration and printed on the margin of a web.

The basic tension on the web is measured by load cells on the first and last cylinders and is set by a bar code which is printed on the web margin to indicate the tension to be applied. If the registration of any one, or more, of the colors being printed is imperfect, for example, due to sidewise or lengthwise movement, the printed image may be blurred and/or the colors may be incorrect. One method to measure registration, as shown in FIG. 5, is to print each of the color squares 20–24 with a different color, e.g., printed by a different cylinder, each within a square yellow border 25. For example, the squares 20–24 are printed, respectively, with magenta, cyan, process black, gold and line black inks. The distances d1, d2 . . . dn are measured or viewed. In FIG. 5 the distance d1 is too small because the color block 20 is beyond its yellow frame 25, and the tension on the take-up rolls should be adjusted to make the distance d1 the same as the distance d2.

The operator watches magnified images of the color squares 20–24 and also compares the images, as they are printed, with a "matchprint" which is the picture to be matched (reproduced).

The grade of the paper label is preferably white high gloss paper and most preferably gold high gloss paper in the range of 50 to 75 pounds.

The plastic film is preferably transparent or translucent plastic film 2 to 4 mils in thickness and may be a suitable polyester, polyethylene or other polymer. The grade of the cardboard may be SBS or clay coated news back recycled paperboard (CNN) and is in the range of 14–22 points.

Figure 2:
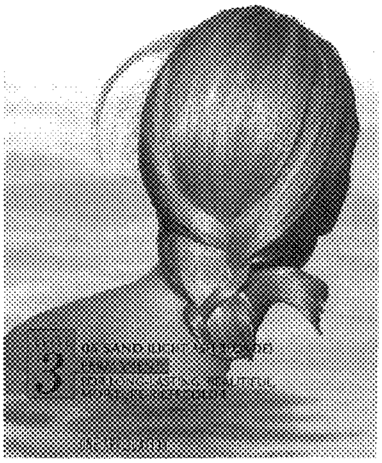
Figure 3:
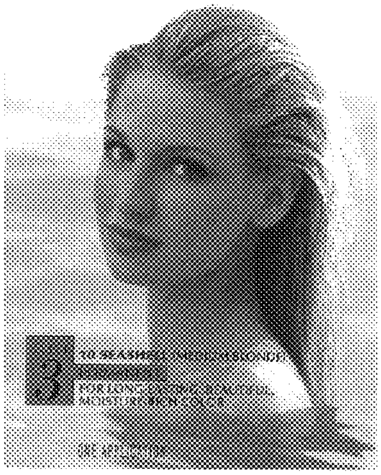

FIGS. 1, 2 and 3 indicate the subtle variations in shape tonalities between three hair dye shades in a color family. A "color family" is a plurality of hair dye colors having common color tones and hues, e.g., black, brown, red, blonde. These three examples are the closest hair dyes, in shade tonality, in a color family.

It is important that the images of hair be exactly the same on all the labels of the same product. Drift of the images during a run, resulting in visible distortion of the images, is not acceptable. However, during a run a number of labels may be rejected, under a quality control program, for various reasons. For example, the response time of the control system may have been too slow, resulting in too much or too little ink.

The hair image is not a simple block of color, as the blocks of color displayed on a paint can or cosmetic face powder container. The hair image is complex and involves shade tonalities, which are shading and shadows as well as internal differences in tone, hue and brightness. If exactly the same hair image is not maintained, the customer may not be able to distinguish related products in the same color family, i.e., she would not be able to distinguish the product of FIG. 1 (shade number 02) from the product of FIG. 2 (shade number 06). The differentiation between the images on the different products must also be kept constant, i.e., the apparent difference between the images on the products of FIGS. 1, 2 and 3 must be the same regardless of where on the web, or run, the labels are selected.

Figure 4:
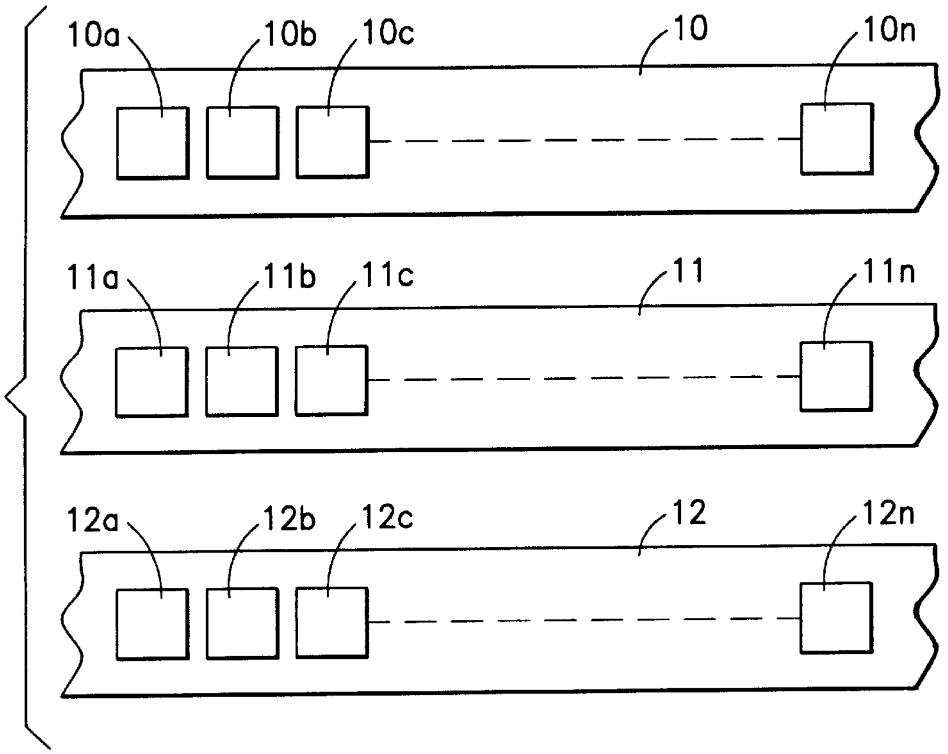
FIG. 4 is a top plan view of three strips of labels on their webs in accordance with the present invention.

As shown in FIG. 4, the webs 10–12 each carry a series of pressure sensitive labels 10*a*, 10*b*, 10*c* . . . 10*n*; 11*a*, 11*b*, 11*c* . . . 11*n*; 12*a*, 12*b*, 12*c* . . . 12*n*, where n is often less than 100,000. For example, the labels 10*a*–10*n* have the image of FIG. 1; the labels 11*a*–11*n* have the image of FIG. 2; and the labels 12*a*–12*n* have the image of FIG. 3. Each image on the web appears exactly the same to the eye, i.e., 10*a* is the same hair color image, in tone, hue and brightness, as the image on label 10*n*. Consequently, there will be a uniform difference in appearance so that the differences between the images as between the labels 10*a*, 11*a* and 12*a* will be the same differences as between the labels 10*n*, 11*n* and 12*n*.

The hair dye colors of the labels on the webs 10–12 are related in color; they are a color family. Generally a color family, such as blonde, has 5 or 6 shades; although a color family may have as many as 10 shades.

The labels are printed using a cylinder (roll) web printing process, preferably rotogravure. The printing is at a normal web printing speed and is at least 10,000 feet per hour.

The labels can be printed in limited "short runs" of less than 100,000 labels, which is an economical printing process. Most importantly, a considerable money saving is obtained by applying the labels to generic cartons, or other containers, which are produced and printed with text, etc. (without the hair color image), in long runs (over 300,000). Such containers produced in long runs are called, herein, generic long run containers.

Modifications may be made in the present invention within the scope of the claims. For example, the transparent plastic carton may be tinted and may be curved, i.e., formed by vacuum molding.

What is claimed is:

1. Hair color product packaging comprising:

(a) a plurality of generic paperboard or plastic containers from a production run of over 300,000 containers, each container having an outer face;

(b) a label affixed to the outer face of each container, the label being a color web-printed label, each container having a label thereon, each label being of high quality white gloss paper or plastic film and having an image of at least a portion of a head of hair of the color and shade tonality sought to be produced by a hair color product within the container, the picture having accurate hair shade tonalities as compared to a matchprint, the color of the hair color product being a member of a color family consisting of closely related shades of color, images on one plurality of labels displaying one hair shade from the color family and images on another plurality of said labels displaying a different and closest related hair shade from the same color family;

the plurality of labels to an observer displaying a uniform difference in appearance between the hair color images on any label from a plurality of said one hair color and any label from the plurality of labels displaying said closest related hair shade.

2. The packaging as in claim 1 wherein the white high gloss paper is in the range of 50–80 pounds paper.

3. The packaging as in claim 1 wherein each label is a pressure sensitive label and the back face of the label is adhered to the outer face of the container.

4. The packaging as in claim 1 wherein the labels are pressure sensitive labels.

5. The packaging as in claim 1 wherein the labels have a printed front face and a back face and the labels are cut out from a web and adhesive applied to the back face.

6. The packaging as in claim 1 wherein the container is a web-printed paperboard carton of solid bleached sulphate (SBS) paperboard.

7. The packaging as in claim 1 wherein the container is of web-printed recycled paperboard.

8. The packaging as in claim 1 wherein the container is a plastic container.

9. The packaging as in claim 1 wherein the container is a bottle.

10. The packaging as in claim 1 wherein the hair color product is a dye, the dye is contained in a bottle, and the bottle is contained in the container.

11. The packaging as in claim 1 wherein the image is of a human model having a head of hair.

12. The packaging as in claim 1 wherein the generic container is a web-printed container.

13. The label as in claim 1 wherein the label is a multi-layer pressure sensitive label.

14. A package for a cosmetic product, the package having a high quality image of a head of hair illustrating an effect produced by the cosmetic product, characterized by a density range of at least 2.0 and a non-high-quality printed subject matter, the package comprising:

(a) a container having, on an outer surface thereof, the non-high quality printed subject matter;

(b) a high-quality white gloss paper or plastic film color web-printed label adhesively affixed to the outer surface of the container and having printed thereon the very high quality image;

the container being selected from a plurality of web-printed generic containers; and the label being selected from a plurality of web-printed labels produced on a high-speed web four-color printing process to form the very high quality images, the very high quality image for each label being essentially exactly the same image as a matchprint.

15. The package as in claim 14 wherein the label is a pressure sensitive label.

16. The package as in claim 14 wherein the label has a printed front face and a back face and the label is cut out from a web and adhesive applied to the back face.

17. The package as in claim 14 wherein the generic container is a web-printed container.

18. The package as in claim 14 wherein the container is a paperboard carton.

19. The package as in claim 18 wherein the paperboard carton is of solid bleached sulphate (SBS).

20. The package as in claim 14 wherein the container is of web-printed recycled paperboard.

21. The package as in claim 14 wherein the container is a plastic container.

22. The package as in claim 14 wherein the container is a bottle.

23. The package as in claim 14 wherein the cosmetic product is a dye, the dye is contained in a bottle, and the bottle is contained in the container.

24. The package as in claim 14 wherein the very high quality image is of a human model having a head of hair.

25. The package as in claim 14 wherein the label is a multi-layer laminate pressure sensitive label.

26. The package as in claim 14 wherein the white gloss paper is in the range of 50–80 pounds paper.

* * * * *